United States Patent [19]
Durandeau et al.

[11] 4,079,906
[45] Mar. 21, 1978

[54] SERVO-CONTROL DEVICE FOR CONTROLLING A CONTROL SURFACE OF AN AIRCRAFT

[75] Inventors: Michel Durandeau, Toulouse; Jean-Pierre Verdier, Cazeres sur Garonne; Norbert Voisin, Toulouse, all of France

[73] Assignee: Societe Nationale Industrielle Aerospatiale, Paris, France

[21] Appl. No.: 779,513

[22] Filed: Mar. 21, 1977

[30] Foreign Application Priority Data

Apr. 5, 1976 France .............................. 76 09778

[51] Int. Cl.² .......................................... G05D 1/00
[52] U.S. Cl. ........................... 244/194; 91/363 A; 91/411 A; 244/78; 244/84; 244/85; 318/564
[58] Field of Search ................. 91/361, 363 R, 363 A, 91/365, 411 R, 411 A; 244/78, 83 F, 83 G, 83 J, 84, 85, 178, 194; 318/563, 564

[56] References Cited

U.S. PATENT DOCUMENTS

| | | | |
|---|---|---|---|
| 3,054,039 | 9/1962 | Meredith | 244/194 X |
| 3,070,071 | 12/1962 | Cooper | 91/363 A X |
| 3,156,855 | 11/1964 | Righton et al. | 244/194 X |
| 3,527,143 | 9/1970 | Hayter | 244/78 X |

Primary Examiner—Stephen G. Kunin
Attorney, Agent, or Firm—Merriam, Marshall & Bicknell

[57] ABSTRACT

In a servocontrol device for controlling a control surface of an aircraft, which device is associated with a mechanical control member such as control column, wheel, pedals, and which comprises two identical double-acting hydraulic rams, integral with each other and each controlled by means of a slide valve, the slide valves each being controlled by a servovalve, whilst each servovalve is controlled by an electrical chain associated therewith, emitting an electrical control signal taking into account the displacements of said control member, the chains are connected to each other by crossed connections and they comprise apparatus for delivering equal signals to said servovalves.

The invention is directed to the control of the control surfaces of an aircraft.

6 Claims, 5 Drawing Figures

SERVO-CONTROL DEVICE FOR CONTROLLING A CONTROL SURFACE OF AN AIRCRAFT

The present invention relates to a servo-control device for controlling a control surface of an aircraft particularly for supersonic aircraft or for heavy transport aircraft.

In aircraft of this type, the efforts required for actuating the control surfaces are known to render the use of servocontrols necessary.

These known servocontrols comprise double-acting hydraulic rams supplied by means of slide valves which are mechanically coupled to the control means (control column, wheel or pedals). In view of the inertias, frictions, variations in dimensions of the cables and control rods as a function of the temperature, the viscosity of the oils used, these control means have certain deficiencies and in particular require substantial effort on the part of the pilot, thus tending to make flying tiring. Furthermore, it is impossible to introduce into such a control circuit parameters relative to the flight configuration of the aircraft (velocity, altitude, pressure, thrust of the motors etc...).

For these different reasons, it has already been envisaged to equip the servocontrols with electrohydraulic servovalves which ensure the displacement of the slide valves as a function of orders electrically transmitted by means of pick-ups (coordinates transformer for example) measuring the displacements of the control members (control column, wheel, pedals). These electrohydraulic servovalves are provided in addition to the mechanical control of the slide valves and it is possible, in normal operation, to disconnect the mechanical control of the slide valves, the control being effected, in this case, solely by electrical transmission.

Moreover, for reasons of safety, the servocontrols are twinned and the same servocontrol receives two distinct signals, coming from two distinct pick-ups, each of which is activated by the same movement of the control members. Dual servocontrols are generally used. A dual servocontrol comprises two identical double-acting hydraulic rams, each ram being supplied by means of a slide valve, the cylinders of the rams and the slide valves being integral and forming a single piece. The pistons of the rams are connected to the same rod, but the pistons of the slide valves, which are each controlled by an electrohydraulic servovalve receiving one of said signals, are connected to the mechanical control pivoted on the body of the rams via independent shafts and rods with springs. Such an assembly enables the accidental seizure of a slide valve piston to be surpassed. In view of the fact that the servovalves are controlled by distinct signals, which ought to be equal, but which are not, it has the drawback of an often imperfect synchronisation of the slide valves, causing momentary hunting or oscillation of the rams around the position of equilibrium, this causing the appearance of a control threshold and of hysteresis.

In the present technique, mechanical correction devices are known which comprise adder circuits. These devices are heavy and do not allow the introduction of additional parameters in the controls.

Electrical devices are also known which make the comparison of the control signals transmitted to the servovalves, eliminating the signals too remote from the assembly and making the average of the others to elaborate a definitive control signal. These devices are complex. They require at least four input signals (issuing for example from computers).

Although they enable certain errors to be corrected, the known devices generally do not allow the slide valves of a dual servocontrol to be synchronised, whilst conserving an independence of said slide valves.

The independence of the slide valves is very important, as the control pressure thereof is not sufficient to surpass the possible seizure of one of them. The pressure in the rams is, on the other hand, sufficient to surpass a gripping or seizure. This is why, in dual servocontrols, the rams are integral with each other.

It is an object of the present invention to remedy the above-mentioned drawbacks and to synchronise the two slide valves of a servo-control whilst conserving their mechanical independence. It also intends to correct the control errors of the slide valves caused by the imperfections of the servovalves. It is therefore possible, according to the invention, to produce a dual servocontrol combining the advantages of a control piloted by one electrical signal : precision, low hysteresis, and the advantages of a control piloted by two distinct electrical signals : security, automatic compensation of the action of a signal elaboration chain, which is out of order, by the action of the other signal elaboration chain which is operating normally.

To this end, the invention relates to a servocontrol device for controlling the control surface of an aircraft, which device is associated with a mechanical control member such as control column, wheel, pedals, and which comprises two identical double-acting hydraulic rams, integral with each other and each controlled by means of a slide valve, said slide valves each being controlled by a servovalve, whilst each servovalve is controlled by an electrical chain associated therewith, emitting an electrical control signal taking into account the displacements of said control member, wherein said chains are connected to each other by crossed connections and they comprise means for delivering equal signals to said servovalves.

Each chain preferably comprises three adders, the first of which receives said electrical control signal and a signal corresponding to the effective displacement of the control surface, whilst the second and third adders both receive the output of the first on one of their inputs, the other input of the second receiving the output signal of the first adder of the other chain and the other input of the third receiving the output of said second, whilst the output of the third adder supplies the corresponding servovalve.

An electrical signal limiter is advantageously disposed between the output of the second adder and the corresponding input of the third, in order that, in the case of failure of one of the chains, the error signal introduced on the other is not too great. Moreover, a by-two divider is introduced between said limiter and the corresponding input of the third adder.

In this way, as will be seen hereinafter, with the two chains functioning normally, the two signals supplying the two servovalves are identical on condition that the servovalves do not have any defaults.

To correct the defaults peculiar to the servovalves, it is advantageous, according to the invention, to provide on each chain, between the output of the first adder and an auxiliary input thereof, a low-pass feedback circuit adapted to reintroduce the output signal with a delay. In this way, the hysteresis, the threshold and the incorrect zero of the servovalves are eliminated.

Finally, to eliminate the dynamic errors, it is advantageous to dispose between the low pass feedback circuit and the output of the corresponding first adder, an auxiliary adder receiving, on inputs of different signs, on the one hand the output signal of said first adder, on the other hand the signal coming from a slide valve position pick-up activated by the servovalve associated therewith.

The invention will be more readily understood on reading the following description with reference to the accompanying drawings, in which:

FIG. 1 schematically shows in section a dual servocontrol of known type.

FIG. 2 illustrates the known supply of the servocontrol of FIG. 1.

FIG. 3 schematically shows the device according to the invention for supplying the servocontrol of FIG. 1.

Figure 1:
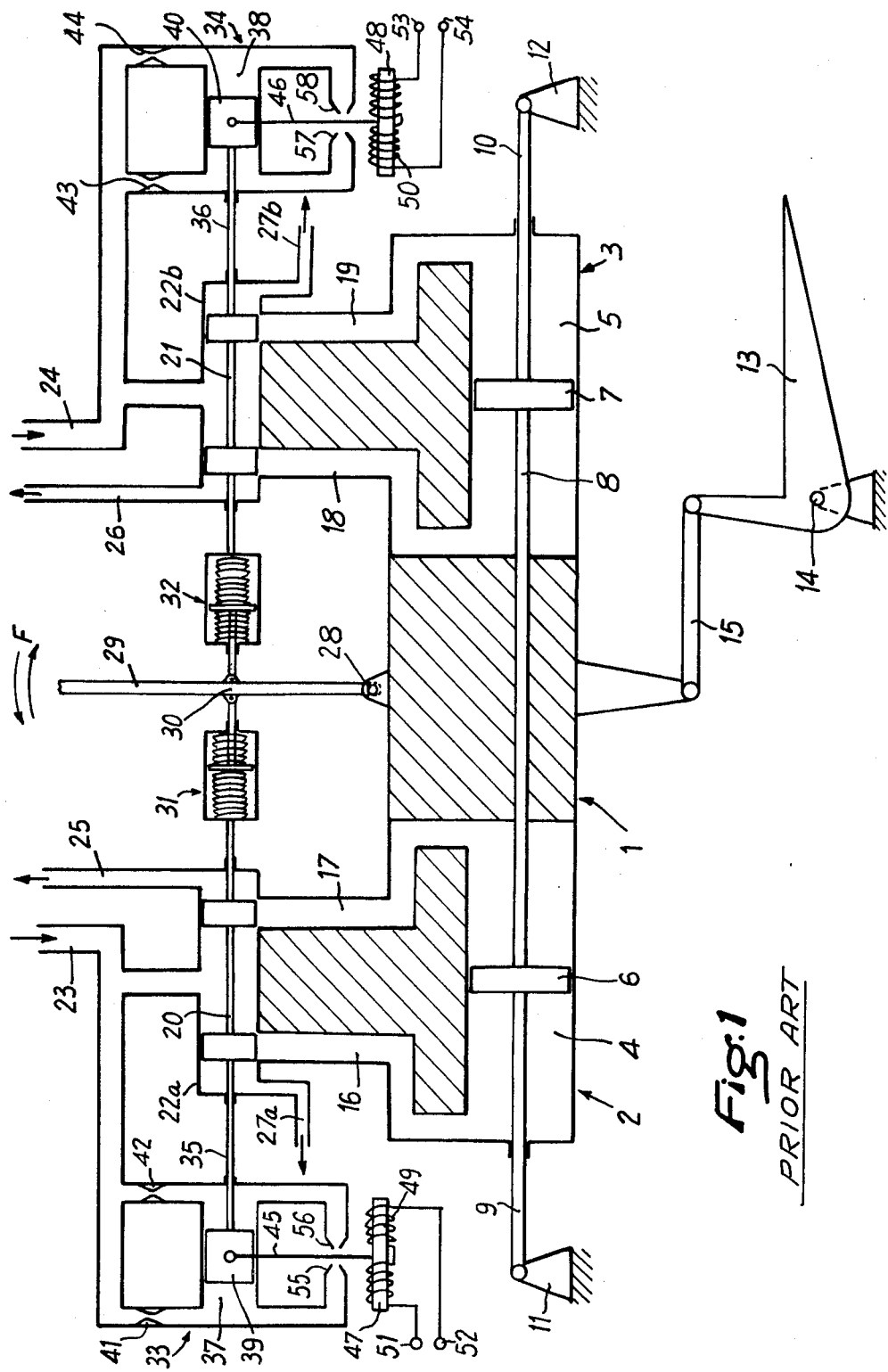

In these Figures, like elements have like references. Referring now to the drawings, FIG. 1 shows a known, so-called dual servocontrol, comprising two symmetrical and identical parts. It comprises a body 1 in one piece formed by two symmetrical parts 2 and 3. In each of said parts is made a cylinder 4 or 5, in which is disposed a piston 6 or 7 respectively. The pistons 6 and 7 are fast with each other via a common piston rod 8, which at its ends 9 and 10 projecting from the body 1, is anchored at 11 and 12 to the structure of an aircraft. In this way, rod 8 and pistons 6 and 7 are fixed with respect to the aircraft and it is the body 1 which may move relatively to pistons 6 and 7, i.e., to the structure of the aircraft. A control surface 13 of the aircraft to be controlled, mounted to pivot at 14 with respect to said latter, is connected to said body 1 by a mechanical connection 15.

At each end of cylinders 4 and 5 is provided a conduit 16, 17, 18 or 19 for the inlet and evacuation of a hydraulic fluid in the corresponding cylinder 4 or 5.

The hydraulic fluid in these cylinders 4 and 5 is controlled by means of slide valves 20 and 21, of which cylinders 22a and 22b are adequately connected via conduits 23 and 24, to a source of pressurised hydraulic fluid (not shown) and by conduits 25, 26, 27a and 27b to a fluid exhaust (likewise not shown).

On body 1, in the plane of symmetry of parts 2 and 3, there is pivoted, at 28, a mechanical control connection, for example a rod 29. The ends opposite the slide valves 20 and 21 are pivoted at 30 to said rod 29, by means of rods 31 and 32 with springs.

By pivoting the rod 29 about its pivot 28 (arrows F), the slide valves 20 and 21 are moved in the same direction in their cylinders 22 or 23 and the hydraulic fluid is sent under pressure in cylinders 4 and 5, on one side or the other of pistons 6 and 7, so that the action of the pressurised fluid on one of the pistons is added to that of the fluid on the other piston.

Furthermore, at their ends opposite rod 29, the slide valves 20 and 21 are connected to electrohydraulic servovalves 33 or 34, by means of slide valve rods 35 or 36. The electrohydraulic servovalves 33 and 34 each comprise a cylinder 37 or 38, in which is disposed a piston 39 or 40 integral with a rod 35 or 36 respectively. Each end of the cylinder 37 or 38 (and therefore each face of pistons 39 and 40), is connected to the source of pressurised fluid by means of conduits, provided with constrictions 41, 42 or 43, 44. On each piston 39 or 40 is pivoted a blade 45 or 46, fast at its end opposite said piston with a soft-iron sliding core 47 or 48, disposed inside a solenoid 49 or 50, which may be supplied by an electrical signal between its terminals 51, 52 or 53, 54. On either side of a blade 45 or 46 are disposed two nozzles 55, 56 and 57, 58, opposite each other, connected to the ends of the cylinders 37 or 38 of pistons 39 and 40. In position of equilibrium, (that shown in FIG. 1), the action on the blade 45 (or 46) of the jet of hydraulic fluid leaving nozzle 55 (or 57) is balanced by that of the jet leaving the nozzle 56 (or 58), this resulting in the pressure drops being identical, in the circuits of the nozzles 55, 56 and 57, 58 and in the pressures being identical on either side of pistons 39 and 40. Consequently, said pistons remain in equilibrium.

On the other hand, as soon as an electrical signal is applied between the terminals 51, 52 or 53, 54 the corresponding core 47 or 48 moves and causes the blade 45 or 46 to approach one of the nozzles 55 or 56 (or 57 or 58), breaking the equilibrium of the system. One of the pressures applied to one of the faces of a piston 39 or 40 becomes greater than that on the other face and the corresponding piston moves, taking with it the slide valve 20 or 21 associated therewith and consequently obliging the body 1 to move with respect to fixed pistons 6 and 7.

In this way, the control surface 13 mays be actuated either manually by mechanical control 29 or by electrical signals applied between terminals 51, 52 or 53, 54.

If the two pairs of terminals 51, 52 and 53, 54 are supplied by the same electrical signal, the actions of the two electrohydraulic servovalves 33 and 34 are combined to move the body 1 and control the control surface 13. On the other hand, if the pairs of terminals 51, 52 and 53, 54 are controlled by distinct signals, it is indispensable that they be absolutely synchronised in order at least temporarily to avoid that one procures an action in one sense and the other in the opposite sense i.e., that their actions contradict each other.

Figure 2:
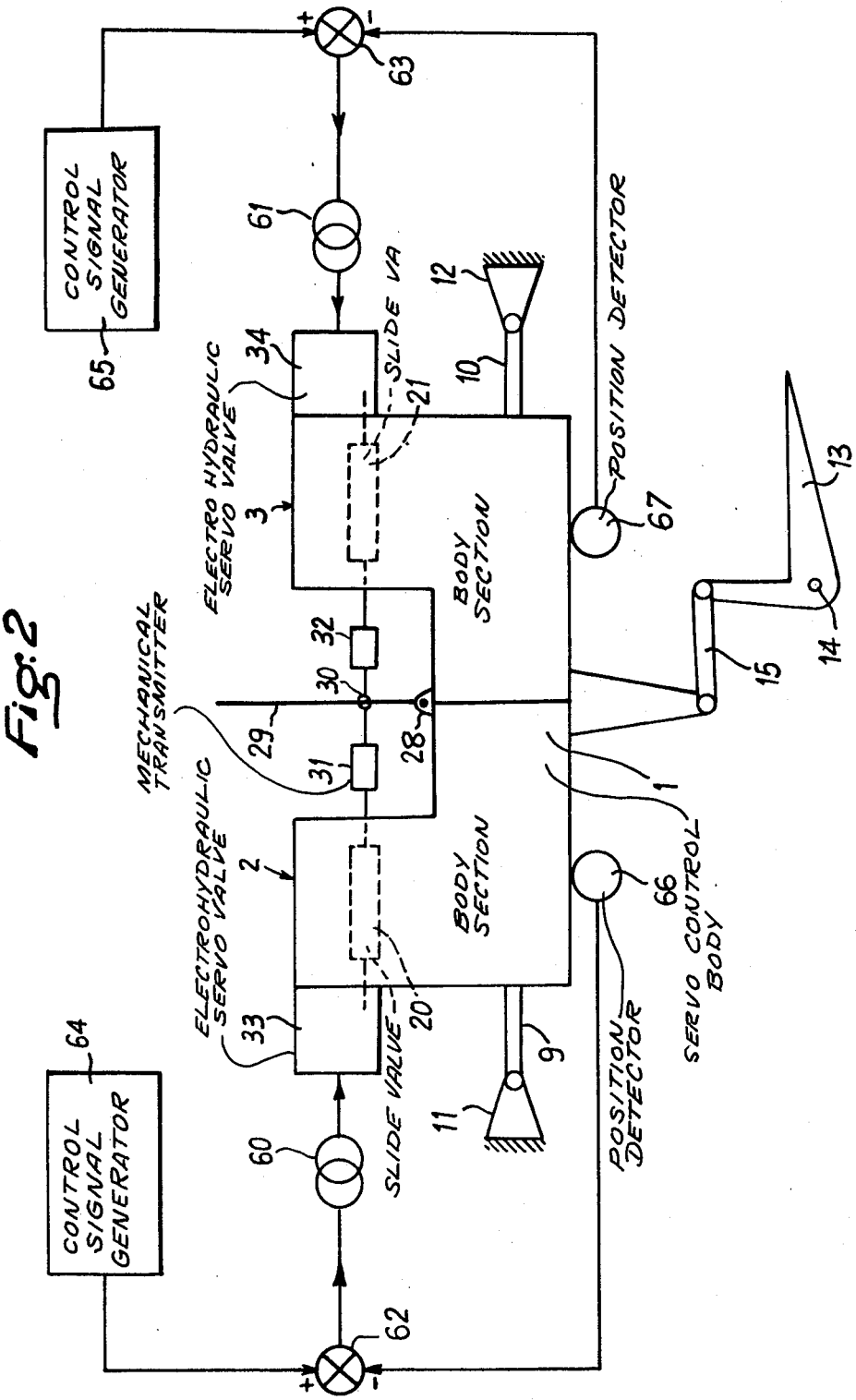

To specify these points, FIG. 2 shows, more schematically than FIG. 1, the dual servocontrol 1, to which have been added electrical supply chains of servovalves 33 and 34. Said latter are supplied respectively by two current generators 60 and 61, receiving their signals from electronic adders 62 and 63 respectively. Each adder receives on the one hand on its +(plus) input a corresponding ram controlled position signal $\theta_1$ or $\theta_2$ coming from an elaboration device 64 or 65 picking up the displacements of the mechanical control member (control column, wheel, pedal) and on the other hand on its −(minus) input a ram position return signal $R_1$ or $R_2$ delivered by a pick-up 66 or 67. Such a pick-up may be disposed on the body 1 or on the control surface 13. Of course, $\theta_1$ and $\theta_2$ are the two values of the same magnitude $\theta$; $\theta_1$ and $\theta_2$ should be equal, but in view of the errors of measurement of devices 64 and 65, they are not. For example, $\theta_1 = \theta + \delta_1$, whilst $\theta_2 = \theta + \delta_2$, $\delta_1$ and $\delta_2$ being low with respect to $\theta$. Similarly, $R_1$ and $R_2$ are two measurements of the same magnitude R, and $R_1 = R + \epsilon_1$ and $R_2 = R + \epsilon_2$, with $\epsilon_1$ and $\epsilon_2$ being low with respect to R.

In this way, if the two servovalves 33 and 34 are active simultaneously:

in normal operation, there are a hysteresis and control thresholds as a function of the algebraic sum of the errors $\delta_1$ and $\delta_2$ occurring in the elaboration of the control orders $\theta_1$ and $\theta_2$ and of the errors $\epsilon_1$ and $\epsilon_2$ due to the position return pick-ups (reproduction of the position of the rams).

in the case of failure of a control chain, the action of the ram whose slide valve is poorly positioned in compensated by the action of the body whose slide valve is positioned by a properly-operating chain, thus producing retraction of the control surface.

To remedy the above-mentioned drawbacks, the invention proposes to add to a "duplex" solution (simultaneous control of the two servovalves) the advantages of a "simplex" solution (very precise synchronisation of the slide valves by control of a single servovalve or by use of one servovalve-slide valve-ram assembly).

If it is therefore assumed that each slide valve is piloted by a servovalve and that each servovalve is controlled by at least one chain elaborating the control signals, the differences in positions between the slide valves have two origins:

errors due to the servovalves themselves, errors produced in the elaboration of the electrical signals introduced on the servovalves (due to the pick-ups and to the treatment of their signals, in particular).

Figure 3:
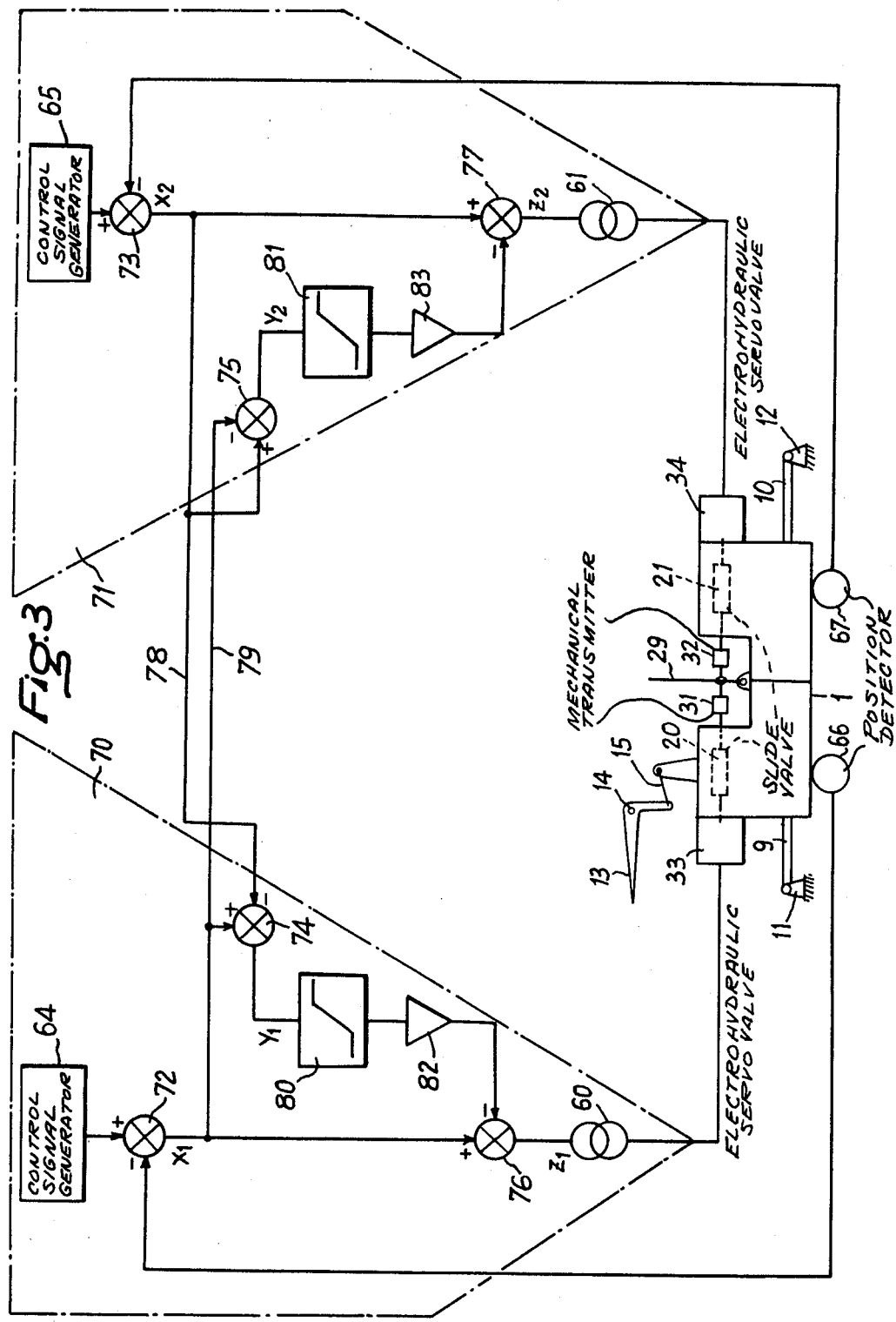

The device illustrated in FIG. 3 is intented for eliminating the errors of the second type mentioned hereinabove. As may be seen, each servovalve 33 and 34 is supplied by its own chain 70 or 71, identical to the other.

Each chain comprises, as before, circuit 64 or 65 for elaborating a control signal $\theta$. This circuit 64 or 65 may for example be a pick-up coupled with a manual piloting control, or a computer receiving the signal from said pick-up and signals as a function of the load of the aircraft, the flight configuration, etc...

The output of said elaboration circuit 64 or 65 is connected to the +(plus) input of a first adding circuit 72 or 73. Each adder 72 or 73 receives on its −(minus) input a signal issuing from the corresponding servocontrol or control surface position pick-up 66 or 67. The output of said adder circuit 72 or 73 is connected on the one hand to the +(plus) input of a second adding circuit 74 or 75 and parallel on the other hand to the +(plus) input of a third adder circuit 76 or 77.

The output of said third adder circuit 76 or 77 is connected to the corresponding servovalve 33 or 34 by means of the current amplifier 60 or 61.

The second adding circuit 74 or 75 of each chain receives on its −(minus) input, via a connection 78 or 79, the signal issuing from the first adding circuit 73 or 72 of the other chain.

The output of said second adding circuit 74 or 75 is connected to the −(minus) input of the third adding circuit 76 or 77 via a limiter circuit 80 or 81 mounted in series with a by-two divider circuit 82 or 83.

Each chain therefore elaborates a control signal $\theta$ and receives a position return signal R.

As mentioned hereinabove, an error $\delta_1$ or $\delta_2$ occurs in the elaboration of $\theta$ and the position return signal is vitiated by an error $\epsilon_1$ or $\epsilon_2$.

The signals at the inputs of the adders 72 and 73 are therefore respectively $\theta_1 = \theta + \delta_1$ and $R_1 = R + \epsilon_1$ for the adder 72
$\theta_2 = \theta + \delta_2$ and $R_2 = R + \epsilon_2$ for the adder 73

The errors introduced by the current amplifiers 60 and 61 and by the servovalves are assumed to be negligibile or compensated for as indicated hereinafter:

The adder 72 therefore delivers at its output a signal
$X1 = (\theta + \delta_1) - (R + \epsilon_1)$ The adder 73 therefore delivers at its output a signal
$X2 = (\theta + \delta_2) - (R + \epsilon_2)$ The adder 74 therefore delivers at its output a signal
$Y1 = X1 - X2 = \delta_1 - \delta_2 + \epsilon_2 - \epsilon_1$ The adder 75 therefore delivers at its output a signal
$Y2 = X2 - X1 = \delta_2 - \delta_1 + \epsilon_1 - \epsilon_2$ The signal Y1, after passage in the limiter (clipper) circuit 80, whose function and interest will be specified hereinafter, and in the by-two divider circuit 82, is subtracted from X1 in the adder 76. The signal Z1 at the output of said latter is therefore:

$$Z1 = (\theta + \delta_1) - (R + \epsilon_1) - \frac{1}{2}(\delta_1 - \delta_2 + \epsilon_2 - \epsilon_1) =$$
$$(\theta + \frac{\delta_1 + \delta_2}{2}) - (R + \frac{\epsilon_1 + \epsilon_2}{2})$$

The same applies to signal Y2 which, after passage in the limiter circuit 81 and division by two in the divider 83, is subtracted from X2 in the adder 77.

The signal Z2 at the output of said latter is therefore:

$$Z2 = (\theta + \delta_2) - (R + \epsilon_2) - \frac{1}{2}(\delta_2 - \delta_1 + \epsilon_1 - \epsilon_2) =$$
$$(\theta + \frac{\delta_1 + \delta_2}{2}) - (R + \frac{\epsilon_1 + \epsilon_2}{2})$$

Consequently, the two current amplifiers 60 and 61 are "attacked" by identical signals and the two slide valves 20 and 21 are perfectly synchronised.

On a given control order, the position of equilibrium will be attained when the two slide valves are at zero i.e., when:

$$\theta + \frac{\delta_1 + \delta_2}{2} - (R + \frac{\epsilon_1 + \epsilon_2}{2}) = O$$

or
$(\theta + \delta_1) + (\theta + \delta_2) = (R + \epsilon_1) + (R + \epsilon_2)$, therefore when the algebraic average of the two orders elaborated is equal to the algebraic average of the two position return signals.

The role of the peak-clippers 80 and 81 is essential and enables the influence of a failure of one of the two chains on the other to be limited.

If, for example, a failure occurs in the elaboration of $\theta + \delta_1$ and causes a considerable error $\delta_1$, the limiter (or peak-clipper) 81 located after the adder 75 will limit the value of the signal Y2 (which signal may be defined as "synchronisation" signal). Consequently, the signal at the output of the adder 77 will ne longer be equal to the signal present at the output of the adder 76 and the two slide valves will be out of synchronisation, but the resultant effect will be much less than if the synchronisation were conserved with a considerable phase shift between the desired control order and the order obtained.

If for example, a servocontrol activates a control surface over an angular range of more or less 30°, it may be considered that the total error ($\delta + \epsilon$) of a chain may have a maximum value of the order of 1°.

It is therefore judicious to fix the value of the peak-clipping to 2° (maximum value of $\delta_1 + \epsilon_1$ $\delta_2 + \epsilon_2$). Under these conditions, the signal Y1/2 or Y2/2 will therefore have a maximum value of 1°.

If chain 70 has a failure, the signal Y2/2 at the output of the divider 83 will add one degree in the sense corresponding to that of the failure to the error signal delivered by chain 71. This difference will be annulled by the position return R, when the control surface will be displaced by 1°. Therefore, from this position shifted by 1 degree with respect to the desired order, the signal of the second chain will become preponderant again and the slide valve 21 will not be synchronous with the slide valve 20, this leading to efforts in the opposite directions of rams 6 and 7.

It is seen that the device according to the invention enables the advantages of a control of the two slide valves by a single chain (very precise synchronisation of the two slide valves) to be combined with the advantages of a control by two separate chains (automatic compensation of the failure of one chain by the action of the second).

As has been mentioned hereinabove, the precision of a servocontrol such as that of FIG. 2 may also be affected by the deficienies peculiar to servovalves 33 and 34. Such deficiencies are as follows:

an incorrect zero
hysteresis
a triggering threshold
a gain error
non-linearities.

If $\theta$ is the controlled position of the control surface 13; R, the actual position of the control surface, given by pick-up 66; U, the position of the slide valve 20, given by a potentiometric pick-up 84 (cf. FIG. 4), the detected position error signal is $e = \theta - R$ and in the range of functioning of the servovalve, the position of the slide valve may be written as follows: $U = E + \Delta$.

When $U = O$ (slide valve closed), the servocontrol is immobile.

To a value of U there corresponds an opening of the slide valve, therefore a flow of oil and consequently a speed of displacement of the ram. The static errors are the errors which affect the stabilised position attained for a given order.

The servocontrol being stabilised, $U = O$, therefore $e = -\Delta$.

The sum of the static errors of the servovalve is therefore translated by a deviation in position: $eo = -\Delta$.

The dynamic errors arise from the deficiencies which affect the speed of displacement of the servocontrol. They are produced by the combination of the error on the gain, the non-linearities and the preceding defaults when $U \neq O$.

It is therefore important, to obtain the most faithful reproduction possible of the control orders, to compensate the different imperfections of the servovalve used. However, these imperfections are not constant and develop as a function of the temperature, ageing, etc...

Figure 4:
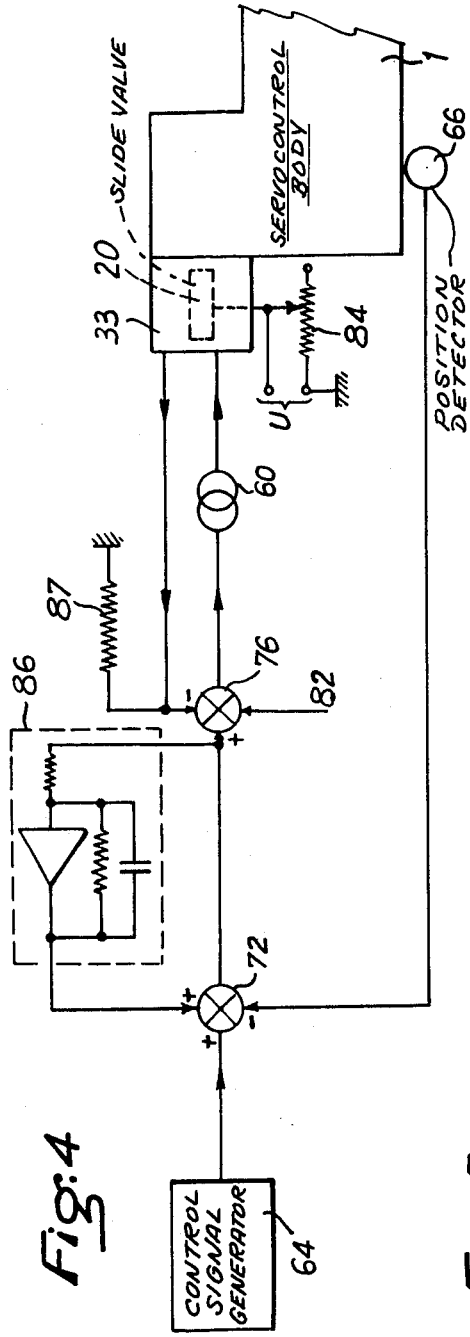
FIG. 4 shows how the static errors of a servovalve of the servocontrol may be corrected.

FIG. 4 schematically illustrates the correction of the static errors of the servovalve 33. Or course, an identical correction is made to the servovalve 34.

In the corrector circuit of FIG. 4, the signal issuing from the adder 72, giving the order of the position error, is reintroduced on an auxiliary +(plus) input of said adder via a circuit 86 having "low-pass" characteristics, so as permanently to ensure the maintenance of the corresponding output value.

The "low-pass" characteristic of this feedback circuit enables any instability to be avoided.

Furthermore, the circuit 86 has a response of the form $$\frac{1}{1 + \tau p}$$

in which expression $p$ is the Laplace variable and $\tau$ a determined period of time.

The position error signal is therefore reintroduced with a delay.

The circuit 86 makes it possible to supply to the auxiliary +(plus) input of the adder 72 a signal compensating the errors introduced by the adder 76 and the elements located downstream thereof.

Moreover, the reintroduction in the adder 76 (via an auxiliary input of said latter) of a part of the current of the servovalve 33 constitutes a negative feedback of the current amplifier 60.

Experience on a servocontrol piloted by a servovalve corrected in the manner shown in FIG. 4, has shown:

that a perfect correction is obtained of static errors reaching 50% of the full control of the servovalve (these errors are normally less than 10% of the full control).

that a time constant of 350 milliseconds for circuit 86 is sufficient to obtain a satisfactory stability.

that any hysteresis disappears in the position control.

that the frequency response of the servocontrol is improved, particularly the phase shifting at low frequences (slow movements).

When the servocontrol undergoes prolonged saturations in speed (rapidity of the movements of the controls greater than the rapidity of response possible of the control surface) or saturations in effort (configuration of the aircraft leading to a higher aerodynamic effort on the control surface than the possible effort of the or each ram), the device of FIG. 4 may supply a non-justified correction signal.

In fact, in these two cases, the error signal $e$ is not solely due to the errors of the servovalves. For example, in the case of saturation of effort, the compensation signal will attain, after $3\tau$, 95% of the maximum value possible.

On the contrary, if $e$ is compared with a signal delivered by a pick-up giving the position of the mechanical member controlled by the servovalve (the slide valve of the servocontrol), the value of the errors introduced between the point of measurement of $e$ and the controlled member is obtained (therefore also the errors introduced by the current amplifier 60).

Figure 5:
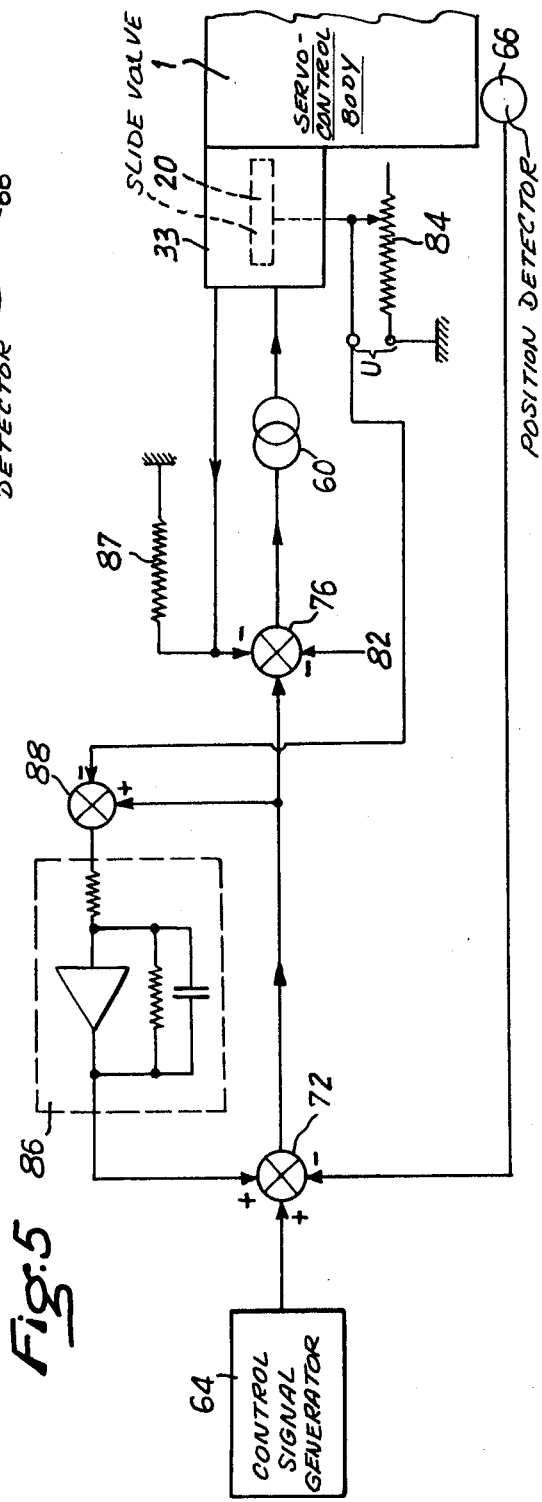
FIG. 5 shows how the static and dynamic errors of a servovalve of the servocontrol may be corrected.

FIG. 5 shows a device enabling the above-mentioned drawback to be remedied and the dynamic errors of the servovalve 33 to be corrected. It shows a potentiometric pick-up 84, coupled with the slide valve 20, and supplying the signal U signifying the position of said slide valve.

Said signal U is introduced with the −(minus) sign on an adder 88 which also receives with the sign + the signal $e$ issuing from adder 72.

The output of the adder 88 is connected to the input of the circuit 86 of which the response is of the form $$\frac{1}{1 + \tau p},$$

as mentioned hereinabove.

In this way, an excessive error signal is automatically diminished by the signal U issuing from the pick-up 84.

In the circuit of FIG. 5, the time constant $\tau$ may be much less than in the circuit of FIG. 4, as the response time of the servovalve-slide valve assembly is generally much shorter than the response time of the servocontrol (the risks of excessive signals by saturation being eliminated).

Tests made with the preceding circuit have shown that the stability of the whole was excellent with a time constant of 33 milliseconds.

The device of FIG. 5 therefore allows the compensation of the static and dynamic errors of the whole and particularly of the servovalves.

Experience has shown that, on a dual servocontrol piloted in duplex with a complete device according to the invention, i.e., with a device comprising the elements for compensating the errors of the servovalves with use of linear slide valve position pick-ups and the synchronisation device with limited control between the two chains (control of more or less 1°):

an excellent synchronisation is obtained in normal functioning. The hysteresis measured under these conditions is 1 minute of degree whilst it is 1 minute and a half in simplex control and without compensation of the errors of servovalves.

the almost complete annulment of the effect of the failure of a chain is obtained by the effect of opposition of the other.

the dynamic performances of a simplex control are reproduced.

What we claim is:

1. A servocontrol device for controlling a control surface of an aircraft, which device is associated with a mechanical control member such as a control column, a wheel or pedals, and which comprises two identical double-acting hydraulic rams, integral with each other and each controlled by means of a slide valve, said slide valves each being controlled by a servovalve, whilst each servovalve is controlled by an electrical chain associated therewith, emitting an electrical control signal taking into account the displacements of said control member, wherein said chains are connected to each other by crossed connections and comprise means for delivering equal signals to said electrovalves, each chain comprising a by-two divider and three adders each having two inputs and one output, the first of said adders receiving said electrical control signal and a signal corresponding to the effective displacement of the control surface, whilst the second and third adders both receive the output signal of the first adders on one of their inputs, the other input of the second adder receiving the output signal of the first adder of the other chain and the other input of the third adder receiving the output signal of said second adder through said by-two divider, whilst the output signal of the third adder is supplied to a corresponding servovalve.

2. A device as claimed in claim 1, wherein a low-pass feedback circuit adapted to reintroduce an output signal with a delay is disposed between said output of the first adder an an auxiliary input thereof.

3. A device as claimed in claim 2, wherein there is disposed between the low-pass feedback circuit and the output of the corresponding first adder, an auxiliary adder receiving, on inputs of different signs, the output signal of said first adder and a signal coming from a slide valve position pick-up activated by the servovalve associated therewith.

4. A device as claimed in claim 2, wherein the low-pass feedback circuit presents a response of the form $$\frac{1}{1 + \tau p},$$

in which $p$ is the Laplace variable and $\tau$ a predetermined period of time.

5. A device as claimed in claim 2, comprising means for reintroducing, on an auxiliary input of the third adder of a chain, a part of the current passing through the corresponding servovalve.

6. A servocontrol device for controlling a control surface of an aircraft, which device is associated with a mechanical control member such as a control column, a wheel or pedals, and which comprises two identical double-acting hydraulic rams, integral with each other and each controlled by means of a slide valve, said slide valves each being controlled by a servovalve, whilst each servovalve is controlled by an electrical chain associated therewith, emitting an electrical control signal taking into account the displacements of said control member, wherein said chains are connected to each other by crossed connections and comprise means for delivering equal signals to said electrovalves, each chain comprising three adders each having two inputs and one output, the first adder receiving said electrical control signal and a signal corresponding to the effective displacement of the control surface, whilst the second and third adders both receive the output signal of the first adder on one of their inputs, the other input of the second adder receiving the output signal of the first adder of the other chain and the other input of the third adder receiving the output signal of said second adder whilst the output signal of the third adder is supplied to a corresponding servovalve, an electrical signal limiter being disposed between the output of the second adder and said other input of the third adder.

* * * * *